May 23, 1967 B. CHAUVIN 3,320,715
APPARATUS FOR SEALING OFF VESSELS
Filed July 14, 1964 3 Sheets-Sheet 1

INVENTOR.
BERNARD CHAUVIN
BY
ATTORNEY.

FIG. 4.
FIG. 5.
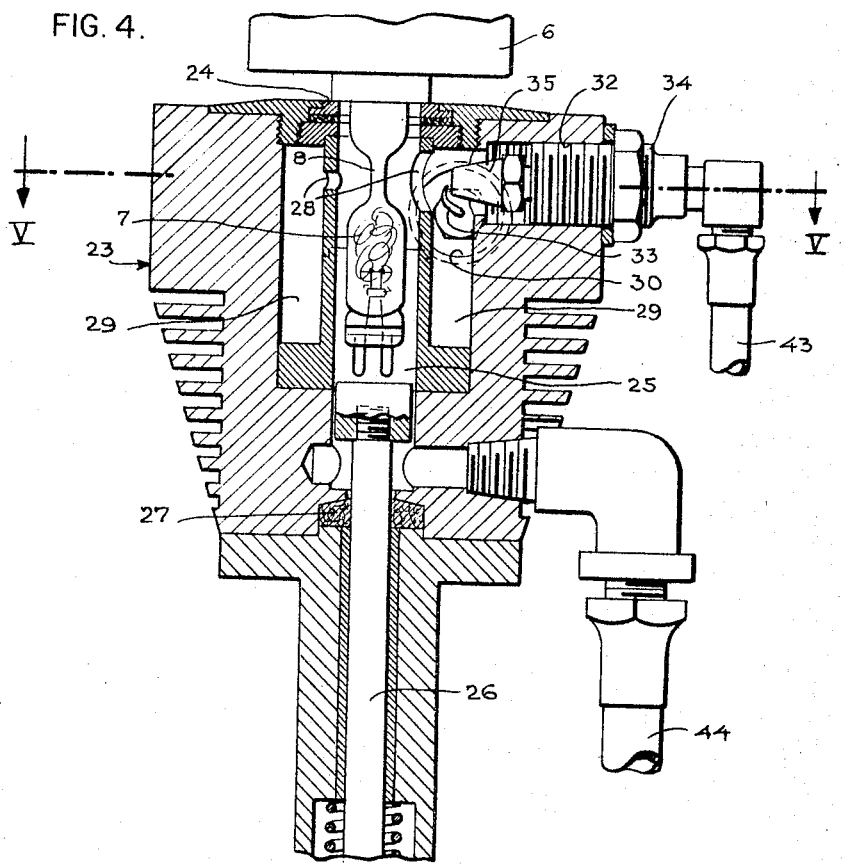
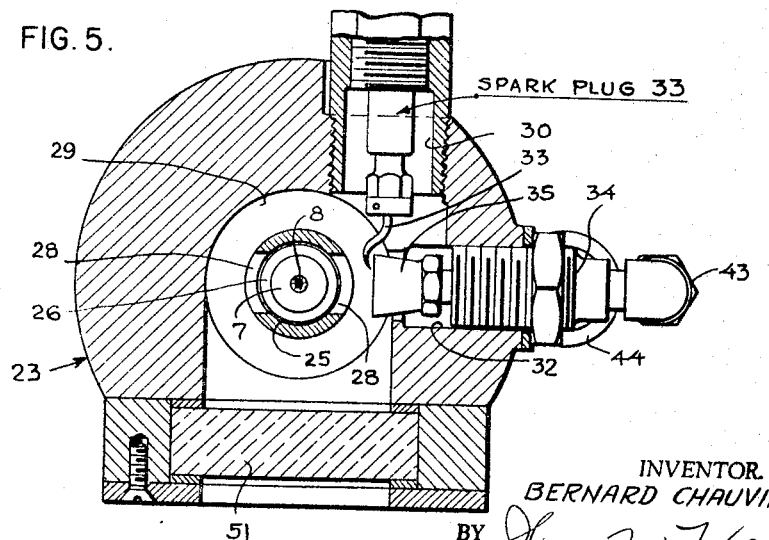
INVENTOR.
BERNARD CHAUVIN

May 23, 1967            B. CHAUVIN            3,320,715
APPARATUS FOR SEALING OFF VESSELS
Filed July 14, 1964                                    3 Sheets-Sheet 3
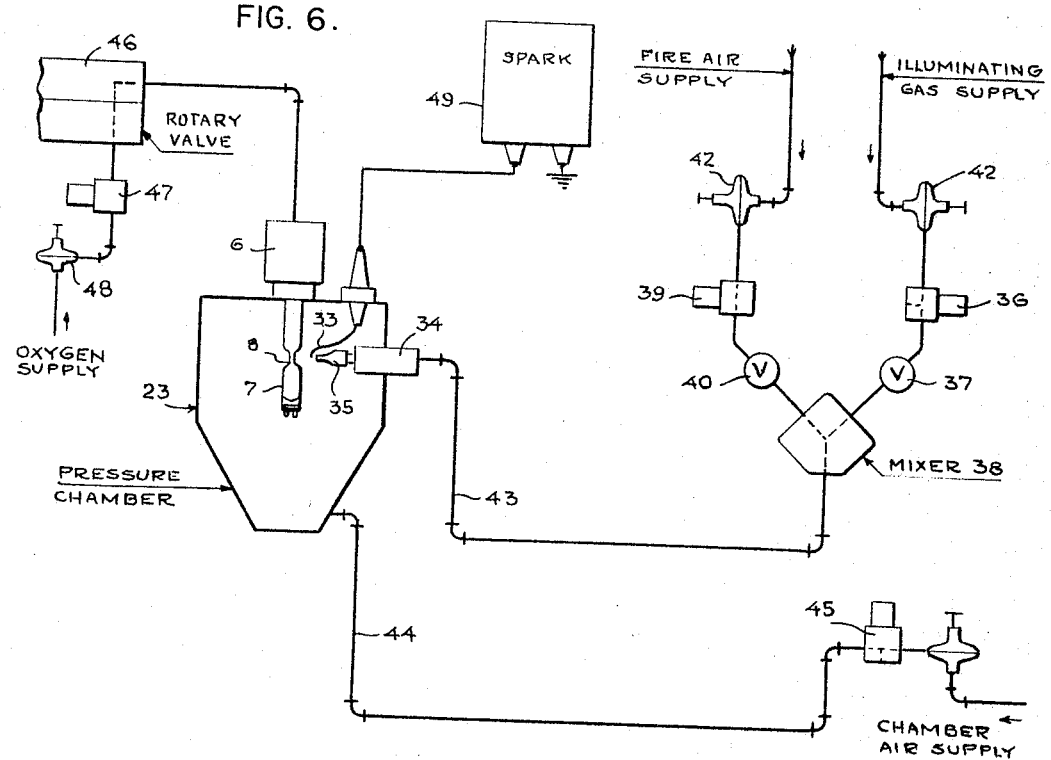
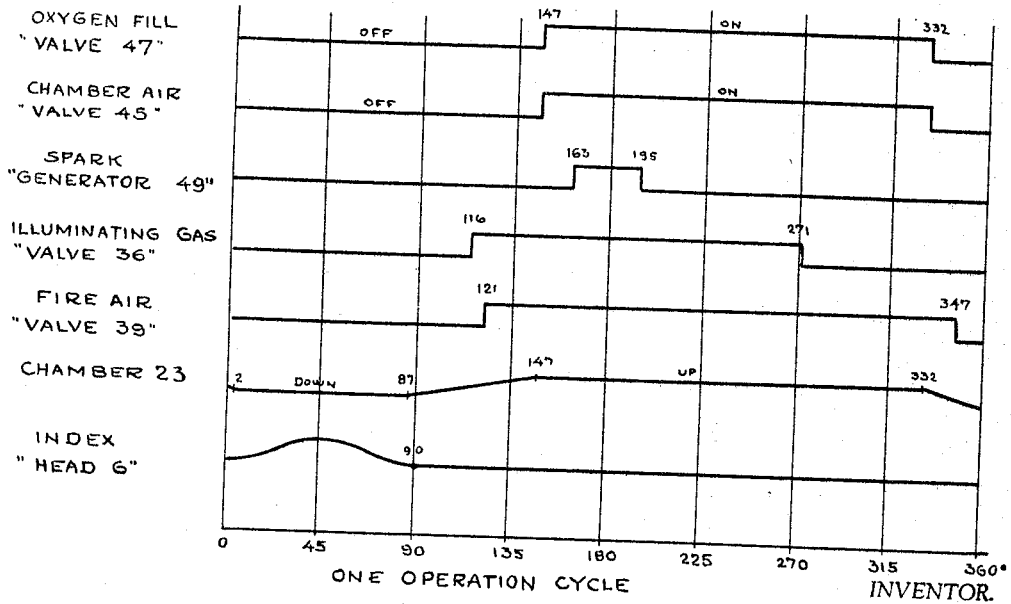
INVENTOR.
BERNARD CHAUVIN
BY
ATTORNEY.

United States Patent Office 3,320,715
Patented May 23, 1967

3,320,715
APPARATUS FOR SEALING OFF VESSELS
Bernard Chauvin, Cedar Grove, N.J., assignor to Westinghouse Electric Corporation, Pittsburgh, Pa., a corporation of Pennsylvania
Filed July 14, 1964, Ser. No. 382,478
10 Claims. (Cl. 53—7)

The present invention relates to an apparatus and method for the sealing off of devices containing gas at a pressure higher than atmospheric, such for example as incandescent lamps and photoflash lamps, containing gas at super-atmospheric pressure.

Apparatus of this general type is now well known in the art but such apparatus heretofore has been subject to the disadvantage of a low production rate due primarily to the time consumed in sealing and tipping off in the pressure chamber. In my prior U.S. Patent No. 2,940,231, granted June 14, 1960, and assigned to the same assignee as the present invention, an apparatus is disclosed and claimed which was intended to eliminate some of the disadvantages of low production rate. Although the apparatus shown and described in such prior patent achieved this desideratum, it is expensive to produce and maintain, especially since it requires the automatic regulation of the flow of gas and air in response to pressure changes within the sealing chamber so as to maintain the tipping-off flame from the burners substantially constant. This requirement along with that of permitting indexing of the devices into and out of the sealing chamber required a "kinetic" type seal for the sealing chamber which at best limited the chamber pressure to a maximum of about 40 p.s.i.

It has also been proposed in the prior art to utilize an apparatus wherein the lamp depending from the exhaust head by its tubulation is first heated to plasticize the latter, after which a pressure chamber seals the lamp and its plasticized tubulation therein. Immediately thereafter a fluid pressure is introduced into the chamber which causes the plasticized tubing to collapse inwardly at its point of highest temperature to seal off the lamp whereupon the pressure is released and sealing chamber removed to allow the sealed-off lamp to be indexed to its next position by the exhaust head turret. The difficulty with this particular type apparatus resided in the fact that the sealing off depended entirely on the latent heat of the exhaust tubulation which necessarily had to be high enough to retain such temperature during the time required to enclose the lamp in the sealing chamber and to bring the latter up to the pressure required to cause closure of the still plasticized tubulation. All too frequently this time lapse, plus the slight cooling effect of the fluid pressure, reduced the temperature of the exhaust tubulation to the point that while it was still hot enough to collapse under pressure, it did not necessarily form a complete sealing off of the lamp. This resulted in a defective or "shrinkage" lamp that could not be satisfactorily detected, which was thus intermingled with good saleable lamps.

It is accordingly the primary object of the present invention to provide an improved method and apparatus for the sealing off of devices such as photoflash lamps having an internal pressure above atmospheric and wherein the device is definitely sealed off with a greater degree of fidelity than heretofore.

Another object of the present invention is the provision of an improved method and apparatus for sealing off devices such as photoflash lamps having an internal pressure above atmospheric by enclosing such device in a "statically" sealed chamber and subjecting it to a pressure greater than its internal pressure and thereafter heating the exhaust tubulation of such device to a temperature sufficient to cause the pressure within the sealed chamber to close the exhaust tubulation and seal off the device.

The foregoing objects of the present invention, together with other objects which will become obvious to those skilled in the art from the following description, are achieved by providing a method and apparatus for the sealing off of devices such as photoflash lamps wherein such lamps depend from the head of an exhaust machine by their exhaust tubulation of a definite maximum diameter and are indexed into a sealing off position of the exhaust machine. At this latter position a pressure chamber forms a "static" seal to hermetically enclose the lamp with its gaseous filling of several atmospheres pressure and a fluid pressure is introduced into the sealed chamber greater than that within the lamp. Thereafter a heating flame is ignited within the pressure chamber which then heats the exhaust tubulation to a temperature at which the pressure within the sealed chamber causes closure of the exhaust tubulation with a definite sealing off of the lamp.

The present invention can be readily understood by reference to the accompanying drawings wherein:

FIG. 4 is a cross-sectional view taken on the line IV—IV of FIG. 1 of the pressure chamber hermetically sealed to an exhaust head from which a photoflash lamp depends by its exhaust tubulation;

FIG. 5 is a cross-sectional view taken on the line V—V of FIG. 4;

FIG. 6 is a diagrammatic illustration of the apparatus of the present invention and showing various cooperating devices operable at appropriate instances during dwell of a photoflash lamp at the sealing off position of an exhaust head; and FIG. 7 is a time chart depicting the sequence of various operations wherein the ordinate represents each individual operation with the abscissa shown degrees of rotation of a cam operated by the exhaust machine.

Figure 1:
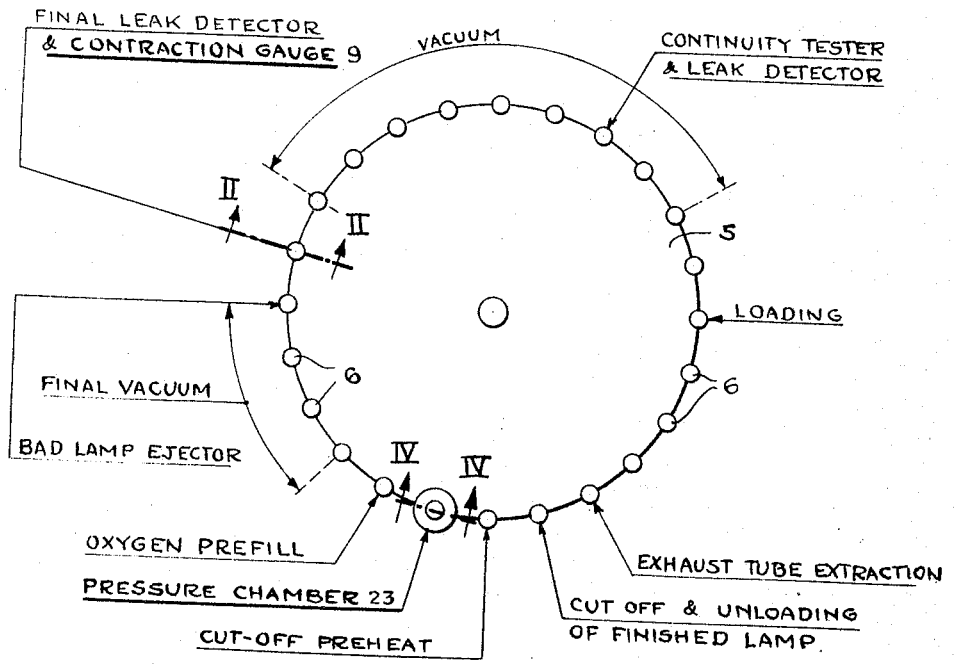
FIGURE 1 is a schematic illustration of an exhaust machine turret showing various work positions to which the exhaust heads thereof are indexed during passage of the photoflash lamp through the exhaust machine operations.

Referring now to the drawings, the exhaust machine turret 5, as shown in FIG. 1, is provided with twenty-four exhaust heads 6 which are indexable through a like number of positions where specific work is performed as indicated by the legends in FIG. 1 as a device, such a photoflash lamp 7 (FIG. 2), dwells at each indexed work station. When indexing into the "Final Leak Detector and Contraction Gauge" station shown in FIG. 1, the photoflash lamp 7, depending from the exhaust machine head 6 by its exhaust tubulation 8, passes through a gauge 9 which limits the maximum diameter of the exhaust tubulation 8.

Should such diameter be too large the apparatus is so conditioned that no further work is performed on the lamp 7 with its defective exhaust stem and such lamp is subsequently ejected from the apparatus at its next "Bad Lamp Ejector" station. This ejection of a lamp 7 with an enlarged exhaust tubulation is highly important since any subsequent attempt to seal off an enlarged tubulation at the "Pressure Chamber" station too frequently fails to actually seal-off the tubulation but merely results in the burner flame puncturing the tubulation causing a shattering of the lamp. When such a shattering occurs, this necessitates completely shutting down of the machine in order to clean the ensuing debris therefrom.

Figure 2:
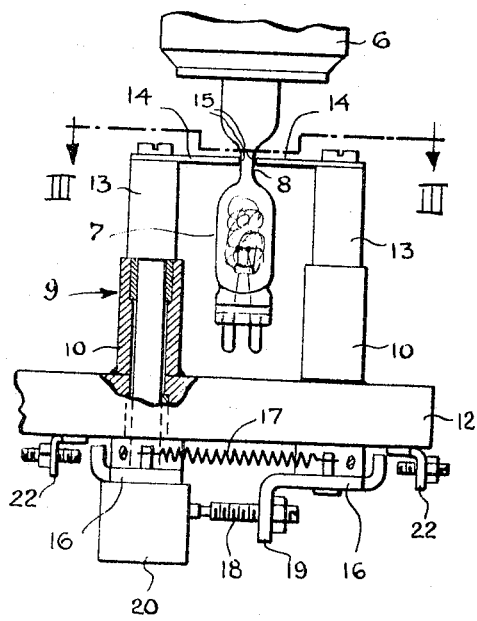
FIG. 2 is a fragmentary elevational view partly in cross-section and taken on the line II—II of FIG. 1 showing a gauge for measuring the diameter of the exhaust tubulation and which forms part of the apparatus of the present invention.
Figure 3:
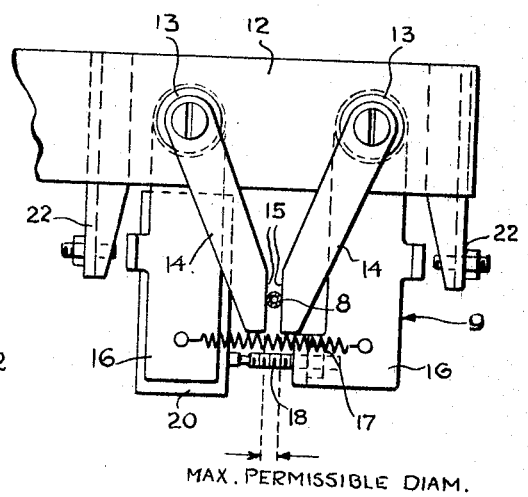
FIG. 3 is a plan view partly in cross-section taken on the line III—III of FIG. 2.

By reference now more specifically to FIGS. 2 and 3 it will be noted that such gauge 9 comprises a pair of spaced annular studs 10 projecting upwardly from a base 12 forming part of the exhaust machine. Journalled within these studs 10 are shafts 13 provided at their upper ends with angularly extending jaws 14 having parallel surfaces 15 at their outer extremity and between which an acceptable exhaust tubulation 8 freely passes. Beneath the base 12 such shafts 13 are provided with substantially parallel arms 16 which are biased toward each other by a coil-spring 17 with the spacing therebetween. The spacing between the parallel surfaces 15 of the upper jaws 14 is determined by an adjusting screw 18 affixed to a bracket 19 carried by one arm 16 and which bears against the operating button of a switch 20. In the event an exhaust tubulation 8 of too large and hence unacceptable diameter approaches the parallel surfaces 15, the arms 14 yield by moving away from each other and thus allow such tubulation 8 to nevertheless pass therebetween.

However, in so yielding the lower parallel arms 16 move away from each other expanding the coil-spring 17 and moving the adjusting screw 18 away from the switch 20 thereby operating an electrical circuit to condition the apparatus to subsequently eject the lamp 7 with its defective enlarged exhaust tubulation 8 from the machine as the "Bad Lamp Ejector" station as shown in FIG. 1. A pair of stops 22 depending from the underside of the base 12 are provided to limit the maximum movement of the lower parallel arms away from each other. When the exhaust tubulation 8 is within the acceptable tolerance limits it passes between the jaws 14 of the gauge 9 and the head 6 accordingly indexes a lamp 7 through the several "Final Vacuum" and the "Oxygen Prefill" stations as shown in FIG. 1.

The operating camshaft (not shown) provided with the conventional indexing cam for indexing the exhaust machine turret shown in FIG. 1 is also provided with a plurality of individual timing cams operable at various degrees of the 360° operating cycle of the operating camshaft. Although such timing cams are not shown per se the timing of their operation in terms of degrees rotation relative to the 360° cycle of the camshaft is schematically illustrated in FIG 7. By reference thereto it will be noted that when the index cam has rotated a total of about 90° as shown by the lower "Index" line, the lamp 7 depending from the exhaust head 6 will then have indexed into the "Pressure Chamber" station of FIG. 1. Just prior thereto, at 87° rotation of the operating camshaft and one of its associated timing cams, a pressure chamber 23 (FIG. 4) begins to move upwardly in the direction of the lamp 7 at the "Pressure Chamber" station. Then at approximately 147° rotation of the operating camshaft and another of its timing cams, as seen by the "Chamber" line in FIG. 7, such pressure chamber 23 forms a "static" seal 24 with the underside of the exhaust head 6 as shown in FIG. 4, to hermetically enclose the lamp 7 therein with a seal sufficiently effective that it can withstand pressures as high as 200 p.s.i.

By reference now more specifically to FIGS. 4 and 5 it will be noted that this metallic pressure chamber 23 is provided with a central bore 25 into the upper end of which the photoflash lamp 7 extends and a stationary support rod 26 projects into the bottom of such bore and forms an hermetic seal 27 therewith, yet allows reciprocal movement of the pressure chamber 23 longitudinally of this support rod 26.

Surrounding the upper end of the bore 25 and communicating therewith through openings 28 is an annular chamber 29 having a pair of horizontal passageways 30 and 32 normal to each other and communicating with such chamber 29. The passageway 32 is hermetically closed by a spark-plug 33 and similarly the passageway 32 is closed by a burner-holder 34 provided with a flame burner 35 at its inner end. Referring now more specifically to FIGS. 6 and 7 it will be noted from the "illuminating gas" line of FIG. 7 that at 116° rotation of the aforementioned operating camshaft with another of its timing cams, and slightly prior to complete sealing of the pressure chamber 23 at 147°, an electric valve 36 (FIG. 6) is opened to admit illuminating gas under control of a needle valve 37 into a mixer 38. Immediately thereafter at 121° rotation of the operating camshaft with still another of its timing cams another electric valve 39 is opened to allow "fire air" under control of its needle valve 40 to be admitted into the mixer 38. During the completion of movement of the pressure chamber 23 from the 121° to the 147° rotation of the operating camshaft and its associated cams, the mixture of gas and air under pressure as determined by a pressure valve 42 flows through a flexible conduit or hose 43 to purge the line as well as the holder 34 and burner 35.

Simultaneously with hermetic sealing of the pressure chamber 23 at 147° rotation of the operating camshaft and its timing cams, and as shown by the lines "chamber air" and "oxygen fill" in FIG. 7, fluid pressure, such as air under pressure, is introduced into the pressure chamber 23 through a flexible line 44 by opening of an electric valve 45. At the same time the internal volume of lamp 7 is also pressurized with "oxygen fill" through the exhaust head 6 and rotary valve 46 upon operation of an electric valve 47 with the oxygen pressure controlled by a pressure valve 48 so as to be lower than the pressure within the chamber 23. Shortly thereafter at 163° rotation of the operating camshaft and a further timing cam as shown by the "spark" line in FIG. 7, a spark is created between the tip of the spark-plug 33 and the burner 35 by the energy supplied from a spark generator 49. This spark is maintained for a short interval from 163° to 195° rotation of the "spark" timing cam to insure against late starting of the heating flame from the burner 35. Once ignited the flame from the burner 35 is self-sustaining, sharp and stable and impinges upon the exhaust tubulation 8 through the adjacent opening 28, heating such tubulation to the softening point which can be observed through the chamber window 51.

Thereupon the weight of the lamp 7 causes it to slightly gravitate which accordingly pulls on the plasticized exhaust tubulation drawing it out and at the same time the greater pressure within the chamber bore 25 causes closure of the heated tubing thus sealing off the oxygen-filled interior of the lamp 7. The burner flame continues until at about 271° rotation of the operating camshaft the flow of illuminating gas is discontinued by operation of the three-way electric valve 36 which thereby immediately extinguishes the burner flame. Operation of this valve 36 shuts off the illuminating gas supply and at the same time vents the chamber 23 to the atmosphere through the burner 35, burner holder 34, line 43, mixer 38, needle valve 37 to the electric valve 36, and thence to the atmosphere. However, the pressure chamber 23 does not lose its pressure since this venting must go through a very small orifice in the burner 35. Following sealing off of the lamp 7 and with the chamber 23 still pressurized it will be noted from FIG. 7 that the "fire air" continues to flow through the burner 9 since its pressure is now slightly above that of the pressurized chamber 23 thereby cooling and hardening the soft seal.

Next the pressure chamber 23 is decompressed through three-way electric valve 45 to the atmosphere and when the operating camshaft with its timing cam has rotated to 332°, the pressure chamber begins to move downward and simultaneously therewith both the "chamber air" and "oxygen fill" are shut off by operation of their respective valves 45 and 47. Since the pressure chamber retracts downwardly on the axial support 26, the latter functions as a stripper to remove at each index any broken lamps and glass pieces from the interior of the chamber bore 25. Also, the "fire air" being still on, a slight pressure continues to be supplied to the annular chamber 29 thereby preventing the support rod 26 from pushing any broken glass into such chamber until the operating camshaft with its "fire air" timing cam reaches 347° in its rotation when the "fire air" is then shut off by operation of electric valve 39. The operating camshaft with its associated timing cams then continues to completion of its 360° cycle which thus occurs in a total elapsed time of 2.4 seconds. The lamp 7 then being sealed off and the work thereon completed at the "Pressure Chamber" station of the exhaust machine turret 5, it is then indexed to the "Cut-Off Preheat" station with the simultaneous indexing of another lamp 7 into the "Pressure Chamber" station preparatory to a repetition of the above described sealing-off operation thereat.

It should thus be apparent to those skilled in the art from the foregoing that an apparatus and method for sealing off vessels such as a photoflash lamp having an internal pressure above atmospheric has been herein provided in which such seal is formed with a high degree of fidelity thus decreasing manufacturing costs by confining shrinkage to a minimum. Moreover, by performing the sealing off of the photoflash lamp in a statically sealed pressure chamber which is very rapidly pressurized and completely decompressed, the dwell time of the lamp at the sealing-off indexed position of the exhaust machine turret is confined to a minimum thus substantially contributing to increased production rate and hence further reducing manufacturing costs.

Although one specific embodiment of the present invention has been herein shown and described it is to be understood that still further modifications thereof may be made without departing from the spirit and scope of the present invention.

I claim as my invention:

1. The method of sealing off a device such as a photoflash lamp having an internal pressure above atmospheric, said method comprising:
   (a) indexing said device into a sealing-off station adjacent an exhaust machine turret,
   (b) hermetically sealing a pressure chamber around said device,
   (c) supplying illuminating gas and air under pressure to a burner within said pressure chamber adjacent said device,
   (d) introducing a gaseous atmosphere under pressure into said device and simultaneously admitting fluid pressure into said chamber at a pressure higher than that of the gaseous atmosphere within said device,
   (e) producing and maintaining a spark within the pressurized chamber for a short interval to assure ignition of the burner therein whereby such burner will heat the exhaust tubulation of said pressurized device to a softening temperature and cause closure thereof with sealing off of said device,
   (f) cutting off the supply of illuminating gas to said burner to cause extinguishment thereof, and
   (g) simultaneously discontinuing the supply of a gaseous atmosphere to said device along with decompressing said pressure chamber and removing the latter from around said sealed-off device.

2. The method of sealing off a device such as a photoflash lamp having an internal pressure above atmospheric comprising:
   (a) indexing said device while depending by its exhaust tubulation from the head of an exhaust machine into a sealing-off station adjacent the exhaust machine turret,
   (b) hermetically sealing a pressure chamber around said device,
   (c) supplying illuminating gas and air under pressure to a burner within said pressure chamber adjacent said device slightly prior to hermetically sealing said chamber,
   (d) introducing a gaseous atmosphere under pressure into said device and simultaneously admitting fluid pressure into said chamber at a pressure higher than that of the gaseous atmosphere within said device,
   (e) producing and maintaining a spark within the pressurized chamber for a short interval to assure ignition of the burner therein whereby such burner will heat the exhaust tubulation of said pressurized device to a softening temperature and cause closure thereof with sealing off of said device,
   (f) cutting off the supply of illuminating gas to said burner to cause extinguishment thereof, and
   (g) simultaneously discontinuing the supply of a gaseous atmosphere to said device along with decompressing said pressure chamber and removing the latter from around said sealed-off device.

3. The method of sealing off a device such as a photoflash lamp having an internal pressure above atmospheric comprising:
   (a) indexing said device while depending by its exhaust tubulation from the head of an exhaust machine into a sealing-off station adjacent the exhaust machine turret,
   (b) hermetically sealing a pressure chamber around said device,
   (c) supplying illuminating gas and air under pressure to a burner within said pressure chamber adjacent said device slightly prior to hermetically sealing said chamber,
   (d) introducing a gaseous atmosphere under pressure into said device and simultaneously admitting fluid pressure into said chamber at a pressure higher than that of the gaseous atmosphere within said device,
   (e) producing and maintaining a spark wtihin the pressurized chamber for a short interval to assure ignition of the burner therein and cause such burner to heat the exhaust tubulation of said pressurized device to a softening temperature whereby the higher pressure in said chamber aided by gravitation of said device causes closure of the plasticized exhaust tubulation and sealing off of said device,
   (f) cutting off the supply of illuminating gas to said burner to cause extinguishment thereof, and
   (g) simultaneously discontinuing the supply of a gaseous atmosphere to said device along with decompressing said pressure chamber and removing the latter from around said sealed-off device.

4. The method of sealing off a device such as a photoflash lamp having an internal pressure above atmospheric comprising:
   (a) indexing said device while depending by its exhaust tubulation from the head of an exhaust machine into a sealing-off station adjacent the exhaust machine turret,
   (b) hermetically sealing a pressure chamber around said device,
   (c) supplying illuminating gas and air under pressure to a burner within said pressure chamber adjacent said device slightly prior to hermetically sealing said chamber,
   (d) introducing a gaseous atmosphere under pressure into said device and simultaneously admitting fluid pressure into said chamber at a pressure higher than that of the gaseous atmosphere within said device,
   (e) producing and maintaining a spark within the pressurized chamber for a short interval to assure ignition of the burner therein and cause such burner to heat the exhaust tubulation of said pressurized device to a softening temperature whereby the higher pressure in said chamber aided by gravitation of said device causes closure of the plasticized exhaust tubulation and sealing off of said device, (f) cutting off the supply of illuminating gas to said burner while continuing the supply of air thereto to cool and harden the sealed exhaust tubulation, and (g) simultaneously discontinuing the supply of a gaseous atmosphere to said device along with decompressing said pressure chamber and removing the latter from around said sealed-off device.

5. Apparatus for sealing off a device provided with a gas at a pressure above atmospheric, said apparatus comprising:

(a) a pressure chamber disposed adjacent a work station of an exhaust machine to which said device is indexed while depending by its exhaust tubulation from a head of said exhaust machine, (b) means operable at a predetermined time following indexing of said device to said work station to cause said pressure chamber to form an hermetic seal about said device, (c) means operable in timed relation to formation of said hermetic seal by said pressure chamber for supplying gas and air to a burner disposed in said pressure chamber adjacent the exhaust tubulation of said device, (d) means for supplying a gaseous atmosphere to the interior of said device and for simultaneously admitting fluid pressure into said chamber at a pressure higher than that of the gaseous atmosphere within said advice, (e) means disposed interiorly of said chamber and operable at a predetermined time interval to ignite said burner and cause heating of the exhaust tubulation of said device to a softening temperature whereby the higher fluid pressure in said chamber aided by slight gravitation of said device causes closure of the plasticized exhaust tubulation and sealing off of said pressurized device, and (f) means operable within a predetermined period of time following sealing off of said device to render said burner inoperative with cooling and hardening of said sealed exhaust tubulation followed by the simultaneous cessation of the supply of the gaseous atmosphere to said device and the decompression of said chamber together with removal of the hermetic seal between said pressure chamber and said sealed-off device to enable the latter to be indexed out of said work station.

6. Apparatus for sealing off a device provided with gas at a pressure above atmospheric comprising:

(a) a pressure chamber disposed adjacent a work station of an exhaust machine to which said device is indexed while depending by its exhaust tubulation from a head of said exhaust machine, (b) means operable at a predetermined time following indexing of said device to said work station to cause said pressure chamber to move and form an hermetic seal about said device, (c) means operable in timed relation to formation of said hermetic seal by said pressure chamber for supplying gas and air to a burner disposed in said pressure chamber adjacent the exhaust tubulation of said device, (d) means for supplying a gaseous atmosphere to the interior of said device and for simultaneously admitting fluid pressure into said chamber at a pressure higher than that of the gaseous atmosphere within said device, (e) ignition means disposed interiorly of said chamber and operable at a predetermined time interval to ignite said burner and cause heating of the exhaust tubulation of said device to a softening temperature whereby the higher fluid pressure in said chamber aided by slight gravitation of said device causes closure of the plasticized exhaust tubulation and sealing off of said pressurized device, and (f) means operable within a predetermined period of time following sealing off of said device to render said burner inoperative with cooling and hardening of said sealed exhaust tubulation followed by the simultaneous cessation of the supply of the gaseous atmosphere to said device and the decompression of said chamber together with movement of the latter from about said sealed-off device so it can be indexed out of said work station.

7. Apparatus for sealing off a device provided with a gas at a pressure above atmospheric comprising:

(a) a pressure chamber disposed adjacent a work station of an exhaust machine to which said device is indexed while depending by its exhaust tubulation from a head of said exhaust machine, (b) means operable at a predetermined time following indexing of said device to said work station to cause said pressure chamber to move and form an hermetic seal about said device, (c) means operable in timed relation to formation of said hermetic seal by said pressure chamber for supplying gas and air to a burner disposed in said pressure chamber adjacent the exhaust tubulation of said device, (d) means for supplying a gaseous atmosphere to the interior of said device and for simultaneously admitting fluid pressure into said chamber at a pressure higher than that of the gaseous atmosphere within said device, (e) ignition means in said pressure chamber connected to an electrical energy source and operable at a predetermined time interval to ignite said burner and cause heating of the exhaust tubulation of said device to a softening temperature whereby the higher fluid pressure in said chamber aided by slight gravitation of said device causes closure of the plasticized exhaust tubulation and sealing off of said pressurized device, and (f) means operable within a predetermined period of time following sealing off of said device to cause extinguishment of said burner with cooling and hardening of said sealed exhaust tubulation followed by the simultaneous cessation of the supply of the gaseous atmosphere to said device and the decompression of said chamber together with movement of the latter from about said sealed-off device so it can be indexed out of said work station.

8. Apparatus for sealing off a device provided with a gas at a pressure above atmospheric comprising:

(a) a pressure chamber carried by a support and disposed beneath a work station of an exhaust machine to which said device is indexed while depending by its exhaust tubulation from a head of said exhaust machine, (b) means operable at a predetermined time following indexing of said device to said work station to cause said pressure chamber to move upwardly on its support and form an hermetic seal about said device, (c) means operable in timed relation to movement of said pressure chamber for supplying gas and air to a burner disposed in said pressure chamber adjacent the exhaust tubulation of said device, (d) means for supplying a gaseous atmosphere to the interior of said device and simultaneously admitting fluid pressure into said chamber at a pressure higher than that of the gaseous atmosphere within said device, (e) a spark plug in said pressure chamber connected to a spark generator and operable at a predetermined time interval to ignite the burner within said pressure chamber and cause said burner to heat the exhaust tubulation of said device to a softening temperature whereby the higher fluid pressure in said chamber aided by slight gravitation of said device causes closure of the plasticized exhaust tubulation and sealing off of said pressurized device, and (f) means operable within a predetermined period of time following sealing off of said device to cause extinguishment of said burner with cooling and hardening of said sealed exhaust tubulation followed by the simultaneous cessation of the supply of the gaseous atmosphere to said device and the decompression of said chamber together with downward movement of the latter from around said sealed-off device so it can be indexed out of said work station.

9. The combination with an exhaust machine turret indexable through a plurality of work stations, of an apparatus for sealing off a device having an exhaust tubulation below a preselected maximum diameter and provided with a gaseous filling therein at a pressure above atmospheric, said apparatus comprising:

(a) means disposed adjacent a work station of said exhaust machine turret and operable to gauge the diameter of the exhaust tubulation of a device as it indexes into said work station to cause said device to be ejected from said turret at a subsequent work station when said exhaust tubulation exceeds a preselected diameter, (b) a pressure chamber disposed adjacent another work station to which an acceptable device is indexed while depending by its exhaust tubulation from a head of said exhaust machine turret, (c) means operable at a predetermined time following indexing of said device to said work station to cause said pressure chamber to form an hermetic seal about said device, (d) means for supplying a gaseous atmosphere to the interior of said device and for simultaneously pressurizing the interior of said chamber at a pressure higher than the gaseous atmosphere within said device, (e) means disposed interiorly of said pressure chamber to heat said exhaust tubulation to a softening temperature whereby the higher pressure in said chamber aided by slight gravitation of said device causes closure of the plasticized exhaust tubulation and sealing off of said pressurized device, and (f) means operable within a predetermined period of time following sealing off of said device to decompress said chamber and remove the hermetic seal thereof from about said sealed-off device to enable indexing of the latter from said work station.

10. The combination with an exhaust machine turret indexable through a plurality of work stations, of an apparatus for sealing off a device having an exhaust tubulation below a preselected maximum diameter and provided with a gaseous filling therein at a pressure above atmospheric, said apparatus comprising:

(a) a gauge disposed adjacent a work station of said exhaust machine turret having a passageway for the travel of an exhaust tubulation of preselected maximum diameter therethrough as a device indexes into said work station, said passageway being yieldable in width to allow travel of an oversize exhaust tubulation therethrough whereby said gauge operates to cause ejection of said defective device at a subsequent work station, (b) a pressure chamber carried by a support and disposed beneath a work station of said exhaust machine turret to which said device is indexable while depending by its exhaust tubulation from a head of said exhaust machine, (c) means operable at a predetermined time following indexing of said device to said work station to cause said pressure chamber to move upwardly on its support and form an hermetic seal about said device, (d) means operable in timed relation to movement of said pressure chamber for supplying gas and air to a burner disposed in said pressure chamber adjacent the exhaust tubulation of said device, (e) means for supplying a gaseous atmosphere to the interior of said device and for simultaneously admitting fluid pressure into said chamber at a pressure higher than that of the gaseous atmosphere within said device, (f) a spark plug in said pressure chamber connected to a spark generator and operable at a predetermined time interval to ignite the burner within said pressure chamber and cause said burner to heat the exhaust tubulation of said device to a softening temperature whereby the higher fluid pressure in said chamber aided by slight gravitation of said device causes closure of the plasticized exhaust tubulation and sealing off of said pressurized device, and (g) means operable within a predetermined period of time following sealing off of said device to cause extinguishment of said burner with cooling and hardening of said sealed exhaust tubulation followed by the simultaneous cessation of the supply of the gaseous atmosphere to said device and the decompression of said chamber together with downward movement of the latter from around said sealed-off device so it can be indexed out of said work station.

References Cited by the Examiner
UNITED STATES PATENTS 2,940,231   6/1960   Chauvin _____ 53—91

TRAVIS S. McGEHEE, *Primary Examiner.*